United States Patent [19]

Willcox

[11] Patent Number: 5,000,917

[45] Date of Patent: Mar. 19, 1991

[54] CORROSION INHIBITION OF POLYMETHYLPHENTHENE

[75] Inventor: Kenneth W. Willcox, Bartlesville, Okla.

[73] Assignee: Phillips Petroleum Company, Bartlesville, Okla.

[21] Appl. No.: 560,392

[22] Filed: Jul. 30, 1990

Related U.S. Application Data

[62] Division of Ser. No. 235,137, Aug. 23, 1988, Pat. No. 4,968,736, which is a division of Ser. No. 161,938, Feb. 29, 1988, Pat. No. 4,793,972.

[51] Int. Cl.$^5$ .............................................. C23F 11/16
[52] U.S. Cl. .................... 422/15; 252/389.24; 422/7; 524/101; 524/579
[58] Field of Search ............... 252/382.24; 422/7, 8, 422/15; 524/101, 579

[56] References Cited

U.S. PATENT DOCUMENTS

| | | | |
|---|---|---|---|
| 3,047,608 | 7/1962 | Friedman et al. | 260/461 |
| 3,909,491 | 9/1975 | Gilles | 260/45.8 NT |
| 3,925,376 | 12/1975 | Chalmers et al. | 260/248 CS |
| 4,025,486 | 5/1977 | Gilles | 260/45.8 NT |
| 4,086,204 | 4/1978 | Cassandrini et al. | 260/45.8 NT |
| 4,152,498 | 5/1979 | Demidova et al. | 526/2 |
| 4,185,004 | 1/1980 | Mathis | 260/45.8 NT |
| 4,291,093 | 9/1981 | Wishman et al. | 428/379 |
| 4,316,837 | 2/1982 | Molt et al. | 260/45.8 N |
| 4,341,880 | 7/1982 | Toyoda et al. | 524/101 |
| 4,444,929 | 4/1984 | Chaser | 524/101 |
| 4,507,416 | 3/1985 | Chasar | 524/101 |
| 4,584,146 | 4/1986 | Chasar | 558/156 |
| 4,624,980 | 11/1986 | Rekers et al. | 524/238 |
| 4,629,752 | 12/1986 | Layer et al. | 524/100 |
| 4,639,479 | 1/1987 | Lai et al. | 524/100 |
| 4,647,629 | 3/1987 | Michel et al. | 525/350 |
| 4,722,806 | 2/1988 | Lai et al. | 252/403 |
| 4,793,972 | 12/1988 | Willcox | 252/389.24 |

FOREIGN PATENT DOCUMENTS

| | | | |
|---|---|---|---|
| 0003842 | 1/1982 | Japan | 524/101 |
| 1339563 | 12/1973 | United Kingdom | 524/101 |

*Primary Examiner*—Michael Lusignan
*Attorney, Agent, or Firm*—Lynda S. Jolly

[57] ABSTRACT

The corrosion tendencies of polymers of 4-methyl-1-pentene, when combined with tris-(3,5-ditert-butyl-4-hydroxybenzyl)isocyanurate and bis-(2,4-ditert-butyl)-pentaerythritol, diphosphite are reduced. Optionally, metal stearates can be added to further reduce the polymer corrosion tendencies.

20 Claims, No Drawings

CORROSION INHIBITION OF POLYMETHYLPHENTHENE

This application is a division of application Ser. No. 07/235,137, filed Aug. 23, 1988, now U.S. Pat. No. 4,968,736, which is a division of application Ser. No. 07/161,938, filed Feb. 29, 1988, now U.S. Pat. No. 4,793,972.

BACKGROUND OF THE INVENTION

This invention relates to homopolymers and copolymers of 4-methyl-1-pentene.

It is known in the art that hindered phenols, organic diphosphites, and/or hindered amine light stabilizers, as antioxidants, can be added to polyolefins to improve the polymer light, heat, and oxidation stability properties. Prior art also teaches that the addition of higher fatty acids and the corresponding metal salts of higher fatty acids can be added to polyolefins, either alone or in combination with other additives, as lubricants. Other additives, such as corrosion inhibitors, can be added to polyolefins to improve a property of the polyolefin. Although the art uses the phrases "polyolefins" and "synthetic polymers", the types of polymers referenced are usually those formed from linear alpha-olefins. Homopolymers and copolymers of branched, higher, alpha-olefins, such as 4-methyl-1-pentene, usually are not specifically disclosed.

SUMMARY OF THE INVENTION

It is an object of this invention to provide a composition comprising homopolymers and copolymers of 4-methyl-1-pentene, tris-(3,5-ditert-butyl-4-hydroxybenzyl)isocyanurate, and bis(2,4-ditert-butyl)pentaerythritol diphosphite that inhibits the corrosive effects of the polymer.

It is another object of this invention to provide a composition comprising homopolymers and copolymers of 4-methyl-1-pentene, tris(3,5-ditert-butyl-4-hydroxybenzyl)isocyanurate, and bis-(2,4-ditert-butyl)pentaerythritol diphosphite, and poly[[6-[(1,1,3,3-tetramethylbutyl)amino]-5-triazine-2,4-diyl][(2,2,6,6-tetramethyl-4-piperidyl)imino]hexamethylene-[2,2,6,6-tetramethyl-4-piperidyl)imino]] that inhibits the corrosive effects of the polymer.

It is yet a further object of this invention to provide a composition comprising stereoregular homopolymers and copolymers of 4-methyl-1-pentene, tris-(3,5-ditert-butyl-4-hydroxybenzyl)isocyanurate, bis-(2,4-ditert-butyl)pentaerythritol diphosphite, and zinc stearate or calcium stearate that inhibits the corrosive effects of the polymer.

It is yet another object of this invention to provide a method for processing homopolymers and copolymers of 4-methyl-1-pentene with reduced corrosion imparted to the processing apparatus.

It is yet another object of this invention to provide a method to coat a metal object with homopolymers and copolymers of 4-methyl-1-pentene whereby corrosion of the metal object is reduced.

In accordance with the present invention, tris-(3,5-ditert-butyl-4-hydroxybenzyl)isocyanurate and bis-(2,4-ditert-butyl)pentaerythritol diphosphite are added to homopolymers and copolymers of 4-methyl-1-pentene in amounts sufficient to reduce the corrosion tendencies of the homopolymer and copolymer. In another embodiment of the invention, zinc stearate, calcium stearate, and/or poly[[6-[(1,1,3,3-tetramethylbutyl)amino]-5-triazine-2,4-diyl][(2,2,6,6-tetramethyl-4-piperidyl)imino]hexamethylene-[2,2,6,6-tetramethyl-4-piperidyl)imino]] are also added to the homopolymers and copolymers of 4-methyl-1-pentene to further reduce the polymer corrosion tendencies. In another embodiment of the invention, homopolymers and copolymers of 4-methyl-1-pentene having reduced corrosion tendencies are used to encapsulate or coat a metal object or a metal-containing substrate.

DESCRIPTION OF PREFERRED EMBODIMENTS

Polymers

This invention is particularly applicable to polymers which have a melting point higher than about 180° C., more preferably, a melting point of greater than about 190° C. Polymers produced from linear monomers, such as ethylene, propylene, butene, and hexene, usually have a lower melting point than polymers of branched, higher, stereoregular alpha-olefins. Thus, the polymers useful in this invention are homopolymers and copolymers of 4-methyl-1-pentene, also called polymethylpentene (PMP). PMP has a melting point of about 240° C.

The term "polymer", as used in this invention, includes homopolymers, as well as copolymers. Copolymers of PMP comprise the product resulting from polymerizing PMP in the presence of any other olefin monomer or monomers. Generally, applicable comonomers have from about 2 to about 18 carbon atoms and preferably, have from about 8 to about 16 carbon atoms. Most preferably, the comonomer or comonomers are alpha-olefins. Longer chain olefins are preferred in that they are easier to copolymerize with 4-methyl-1-pentene and can impart increased stability and strength to the resultant polymer. Exemplary comonomers include, but are not limited to, 1-octene, 1-decene, 1-dodecene, 1-tetradecene, 1-hexadecene, and other higher olefins.

In general, it is preferred for the polymer to comprise at least about 85 mole percent moieties derived from 4-methyl-1-pentene, and more preferably, at least about 90 mole percent. Most preferably, the polymer comprises at least about 95 mole percent moities derived from 4-methyl-1-pentene, which results in a polymer of superior strength and a high melting point.

Additives

Chemical additives are frequently combined with olefin polymers to improve selected desired physical properties of the polymer. For example, antioxidants can be added to improve heat, light, and oxidation stability. Numerous polymer antioxidant additives are commercially available and are usually selected from the group consisting of hindered phenols, organic phosphites, hindered amine light stabilizers, and mixtures thereof. Other compounds can be used as antioxidants. Processing lubricants can also be added to enhance polymer properties. Examples of processing lubricants include, but are not limited to, fatty acids containing about 10 to about 20 carbon atoms and the metal salts thereof. Usually, metal stearates and/or metal laurates are used as processing lubricants for polyolefins. If corrosion is a potential problem, one or more corrosion inhibitors can be added.

As defined for this disclosure, the stability of a polymer is an indication or measure of how the polymer is affected by external forces, such as, for example, light, heat and oxygen, acting on or reacting with the polymer. Stability, in other words, is a measure or indication of changes occurring in and/or to the polymer. Corrosion is defined as an indication or measure of how corrosive the polymer composition is on the surface of an article or mold, i.e., the affect a polymer has on a different object. Corrosion, therefore, is a measure or indication of changes caused by residual catalyst and polymerization by-products in the polymer.

Surprisingly, it has been discovered that the combination of two specific antioxidants to polymethylpentene impart corrosion inhibiting effects. A composition comprising polymers of 4-methyl-1-pentene, tris-(3,5-ditertbutyl-4-hydroxybenzyl)isocyanurate, and bis-(2,4-ditert-butyl)pentaerythritol diphosphite produces a polymer having reduced corrosion tendancies than polymers of 4-methyl-1-pentene without these two specific antioxidants.

The addition of sufficient amounts of tris-(3,5-ditertbutyl-4-hydroxybenzyl)isocyanurate and bis-(2,4-ditertbutyl)pentaerythritol diphosphite to polymers of 4-methyl-1-pentene can inhibit the corrosive effects of polymethylpentene. Generally, tris-(3,5-ditert-butyl-4-hydroxybenzyl)isocyanurate is present in the corrosion inhibited polymer in the range of about 0.1 to about 1 parts by weight of tris-(3,5-ditert-butyl-4-hydroxybenzyl)isocyanurate per 100 parts by weight of polymer (php) and bis-(2,4-ditert-butyl)pentaerythritol diphosphite is present in the corrosion inhibited polymer in the range of about 0.1 to about 1 parts by weight of bis-(2,4-ditert-butyl)pentaerythritol diphosphite per 100 parts by weight of polymer (php). Preferably, tris-(3,5-ditert-butyl-4-hydroxybenzyl)isocyanurate is present in the polymer in the range of about 0.1 to about 0.3 php and bis-(2,4-ditert-butyl)pentaerythritol diphosphite is present in the polymer in the range of about 0.2 to about 0.4 php. Most preferably, tris-(3,5-ditert-butyl-4-hydroxybenzyl)isocyanurate is present in the corrosion inhibited polymer in the range of about 0.15 to about 0.25 php and bis-(2,4-ditert-butyl)pentaerythritol diphosphite is present in the corrosion inhibited polymer in the range of about 0.25 to about 0.35 php. Too much of either the hindered phenol or the organic diphosphite can decrease the polymer stability; the additives can act as a prodegradant to the polymer. An insufficient amount of either additive can impart no corrosion inhibition effect to the polymer.

In addition to the basic composition of polymethylpentene, tris-(3,5-ditert-butyl-4-hydroxybenzyl)isocyanurate, and bis-(2,4-ditert-butyl)pentaerythritol diphosphite, additional compounds, or additives, can be added to further decrease or, even, totally eliminate the corrosive effects of the polymethylpentene. Metal stearates, such as, for example, zinc stearate, calcium stearate, and mixtures thereof can be added to the polymethylpentene composition to further enhance corrosion inhibition. Metal stearates also can have a lubricating effect on the polymer. The amount of metal stearate that can be added to the polymethylpentene composition is any amount necessary to further reduce the corrosive effects of the polymer or any amount to sufficiently improve lubrication of the polymer. Generally, metal stearates can be present in the polymethylpentene composition in the range of about 0.05 to about 1 php, preferably, in the range of about 0.05 to about 0.15 php. Most preferably, metal stearates are present in the polymethylpentene composition in the range of about 0.07 to about 0.13 php. Addition of metal stearates within these ranges maintains a polymer with appropriate clarity. Too much metal stearate can cloud the polymer and too little metal stearate can impart no beneficial affect to the polymer.

Hindered amine light stabilizers, such as, for example, polymeric hindered amines like piperidenyl triazine polymers and piperidenyl triazine derivative polymers, when added to the inventive corrosion inhibiting polymethylpentene composition, can further reduce the corrosion caused by the polymethylpentene. It has been found that the addition of an appropriate amount of poly[[6-[(1,1,3,3-tetramethylbutyl)amino]-5-triazine-2,4-diyl]][(2,2,6,6-tetramethyl-4-piperidyl)imino]hexamethylene-[2,2,6,6-tetramethyl-4-piperidyl)imino]] can completely eliminate the corrosive effects of the inventive 4-methyl-1-pentene polymer composition. These types of piperidenyl triazine polymers are disclosed in U.S. Pat. No. 4,086,204, herein incorporated by reference. Too much poly[[6-[(1,1,3,3-tetramethylbutyl)amino]-5-triazine-2,4-diyl]][(2,2,6,6-tetramethyl-4-piperidyl)imino]hexamethylene-[2,2,6,6-tetramethyl-4-piperidyl)imino]] can act as a prodegradant to the polymer and an insufficient amount of poly[[6-[(1,1,3,3-tetramethylbutyl)amino]-5-triazine-2,4-diyl]][(2,2,6,6-tetramethyl-4-piperidyl)imino]hexamethylene-[2,2,6,6-tetramethyl-4-piperidyl)imino]] can result in no additional corrosion inhibiting effects. Generally, poly[[6-[(1,1,3,3-tetramethylbutyl)amino]-5-triazine-2,4-diyl]][(2,2,6,6-tetramethyl-4-piperidyl)imino]hexamethylene-[2,2,6,6-tetramethyl-4-piperidyl)imino]] is present in the polymethylpentene composition in the range of about 0.1 to about 1 php, and preferably, in the range of about 0.1 to about 0.3 php. For most effective use of poly[[6-[(1,1,3,3-tetramethylbutyl)amino]-5-triazine-2,4-diyl]][(2,2,6,6-tetramethyl-4-piperidyl)imino]hexamethylene-[2,2,6,6-tetramethyl-4-piperidyl)imino]] it is preferably added to the polymethylpentene composition in the range of about 0.15 to about 0.25 php.

As stated earlier, other additives optionally can be incorporated into the corrosion inhibiting polymethylpentene to achieve additionally desired beneficial polymer properties. General exemplary additives include, but are not limited to, antioxidants, UV absorbers, nickel stabilizers, pigments, charges, plastifying agents, antistatic agents, flame retardants, lubricating agents, more anticorrosive agents, metal inhibitors, and the like.

Any of the additives herein discussed can be combined with polymers of 4-methyl-1-pentene according to any method known in the art. Examples of incorporation methods include, but are not limited to, dry mixing in the form of a powder, and wet mixing in the form of a solution or slurry. In these types of methods, the polymethylpentene can be in any form, such as, for example, fluff, powder, granulate, pellet, solution, slurry, and/or emulsion.

POLYMER APPLICATIONS

The polymethylpentene compositions of the invention are especially advantageous for use in any type of polymer processing equipment. The PMP polymer comprising tris-(3,5-ditert-butyl-4-hydroxybenzyl)isocyanurate and bis-(2,4-ditert-butyl)pentaerythritol diphosphite and any other desired additive can have a less corrosive effect on the processing equipment than does a PMP polymer without tris-(3,5-ditert-butyl-4-hydroxybenzyl)isocyanurate and bis-(2,4-ditert-butyl)-pentaerythritol diphosphite. Examples of such equipment and equipment components include, but are not limited to, all types of mixing vessels; storage vessels; blenders; mixers; pelletizers; extruders; transfer tubes; screws; spinnarets; barrels; cutting blades; hoppers; dies; molds, for use in thermoforming, injection, molding, blow molding, and rotomolding; spinning; and other equipment surfaces likely to contact the PMP.

The PMP compositions of the invention are also especially advantageous for encapsulating or coating a metal-containing substrate, or a metal object. A composition comprising polymethylpentene, tris-(3,5-ditert-butyl-4-hydroxybenzyl)isocyanurate, and bis-(2,4-ditert-butyl)pentaerythritol diphosphite can have a less corrosive effect on a metal portion of a metal-containing substrate or metal object, than does polymethylpentene without tris-(3,5-ditert-butyl-4-hydroxybenzyl)isocyanurate and bis-(2,4-ditert-butyl)pentaerythritol diphosphite. Examples of metals that can be coated or encapsulated with compositions of this invention include, but are not limited to, copper, gold, silver, aluminum, chromium, titanium, iron, and steels, such as chromium plated steels, carbon steels, and stainless steels, and the like, and alloys thereof.

EXAMPLES

Example 1

Polymethylpentene prepared by conventional commercially available catalysts and given a prophylactic charge of a 0.05 weight percent charge of octadecyl-3-(3,5-ditert-4-hydroxyphenyl)propionate (sold as Irganox 1076, available from Ciba-Geigy Corp.) in hexane solution was subjected to an accelerated corrosion test described as follows:

The polymer to be tested for corrosion is compression molded against a 1.25" diameter disk of mild carbon steel (SAE 1200) at 32,600 psi (40,000 lbs total force) for a 15 minute time period at an elevated temperature. The temperature of the compression molding step depends on the polymeric material being evaluated. If the polymer to be tested is polypropylene, the temperature used is 500° F. (260° C.) while if the polymer to be tested is polymethylpentene, the temperature used for the test is 550° F. (288° C.). The samples are allowed to cool to ambient temperature before removing the polymer and steel disk from the sample press. When cooled, the polymer is separated from the disk and the disk placed in a desiccator at 100% relative humidity for 18±2 hours. At the completion of the test, the sample disk is removed from the dessicator and visually compared for pitting corrosion to a uniquely developed series of nine SAE 1200 mild carbon steel disks systematically varying in the extent of pitting corrosion ranging in value from 0 to 4 by half steps with 0 showing no pitting corrosion and 4 showing the greatest pitting corrosion.

A corrosion number of 3.5 was obtained as a result and provides a basis for comparison of polymethylpentene treated with various additive compounds in Examples 2 through 8.

Example 2

Polymethylpentene, prepared and charged as in Example 1, was blended with 0.2 parts by weight of tris-(3,5-ditert-butyl-4-hydroxylbenzyl)isocyanurate (sold as Goodrite 3114, available from Goodrich Chemical Co.; now sold as Irganox 3114, available from Ciba-Geigy Corp.) per 100 parts by weight of polymer (php) and subjected to the corrosion test described in Example 1; the resulting corrosion was found to be less than that observed in Example, 1 being 3.0.

Example 3

Polymethylpentene, prepared and charged as in Example 1, was blended with 0.3 php bis-(2,4-ditert-butyl)-pentaerythritol diphosphite (sold as Ultranox 626, available from Borg-Warner Chemical Co.) and subjected to the corrosion test described in Example 1; the resulting corrosion was found to be less than that observed in Example 1, being 2.5.

Example 4

Polymethylpentene, prepared and charged as in Example 1, was blended with 0.2 php tris-(3,5-ditert-butyl-4-hydroxybenzyl)isocyanurate and 0.3 php bis-(2,4-ditert-butyl)pentaerythritol diphosphite and subjected to the corrosion test described in Example 1; the resulting corrosion was found to be less than observed in Example 1, being 2.0.

Example 5

Polymethylpentene, prepared and charged as in Example 1, was blended with 0.3 php bis-(2,4-ditert-butyl)-pentaerythritol diphosphite, 0.2 php tris-(3,5-ditert-butyl-4-hydroxybenzyl)isocyanurate, and 0.1 php zinc stearate and subjected to the corrosion test described in Example 1; the resulting corrosion was found to be less than that observed in Example 1, being 1.5.

Example 6

Polymethylpentene, prepared and charged as in Example 1, was blended with 0.3 php bis-(2,4-ditert-butyl)-pentaerythritol diphosphite, 0.2 php tris-(3,5-ditert-butyl-4-hydroxybenzyl)isocyanurate, and 0.2 php poly[[6-[(1,1,3,3-tetramethylbutyl)amino]-5-triazine-2,4-diyl][(2,2,6,6-tetramethyl-4-piperidyl)imino]hexamethylene-[2,2,6,6-tetramethyl-4-piperidyl)imino]] (sold as Chimassorb 944, available from Ciba-Geigy Corp.) and subjected to the corrosion test described in Example 1; the resulting corrosion was found to be less than that observed in Example 1, being 0.0, that is no detectable corrosion was observed.

Example 7

Polymethylpentene, prepared and charged as in Example 1, was blended with 0.3 php bis-(2,4-ditert-butyl)-pentaerythritol diphosphite, 0.2 php tris-(3,5-ditert-butyl-4-hydroxybenzyl)isocyanurate, and 0.2 php bis(2,2,6,6-tetramethyl-4-piperidinyl)sebacate (sold as Tinuvin 770, available from and subjected to the corrosion test described in Example 1; the resulting corrosion was found to increase by comparison Example 4, being 3.0.

Example 8

Polymethylpentene, prepared and charged as in Example 1, was blended with 0.3 php bis-(2,4-ditert-butyl)-pentaerythritol diphosphite, 0.2 php tris-(3,5-ditert-butyl-4-hydroxybenzyl)isocyanurate, and 0.2 php hexadecyl-3,5-di-tert-butyl-4-hydroxy benzoate (sold as UV 2908, available from American Cyanamid Co.) and subjected to the corrosion test described in Example 1; the resulting corrosion was found to increase by comparison to Example 4, being 2.5.

Example 9

Polypropylene, prepared by conventional commercially available catalysts containing a prophylactic charge of 0.015 php octadecyl-3-(3,5-ditert-butyl-4-hydroxyphenyl)propionate in hexane solution, was subjected the corrosion test of Example 1 with the result that a corrosion number of 2.0 was obtained as a result and provides a basis for comparison of polypropylene treated with various additive compounds in Examples 10 through 13.

Example 10

The additive used in Example 2 was blended at the same php level with polypropylene, which was prepared and charged as in Example 9, and was subjected to the corrosion test of Example 1 with the result that no improvement in corrosion resistance was obtained, the result being 2.0.

Example 11

The additive used in Example 3 was blended at the same php level with polypropylene, which was prepared and charged as in Example 9, and was subjected to the corrosion test of Example 1 with the result that no improvement in corrosion resistance was obtained, the result being 2.0.

Example 12

The additives used in Example 4 were blended at the same php levels with polypropylene, which was prepared and charged as in Example 9, and was subjected to the corrosion test of Example 1 with the result that no improvement in corrosion resistance was obtained, the result being 2.0.

Example 13

The additives used in Example 5 were blended at the same php levels with polypropylene, which was prepared and charged as in Example 9, and was subjected to the corrosion test of Example 1 with the result that corrosion was descreased slightly to a value of 1.5 from the reference value of 2.0 for polypropylene.

Example 14

Polypropylene, prepared by a commercially available catalyst similar to that of Examples 9 through 13, containing a prophylactic charge of 0.015 php octadecyl-3-(3,5-ditert-butyl-4-hydroxyphenyl)propionate in hexane solution, was subjected to the corrosion test of Example 1 with the result that a corrosion numbers of 0.5 was obtained.

Example 15

Polypropylene, prepared and charged as in Example 14, was blended with 0.2 php tris-(3,5-ditert-butyl-4-hydroxybenzyl)isocyanurate, 0.3 php bis-(2,4-ditert-butyl)pentaerythritol diphosphite, and 0.2 php poly[[6-[(1,1,3,3-teteramethylbutyl)amino]-5-triazine-2,4-diyl][(2,2,6,6-tetramethyl-4-piperidyl)imino]hexamethylene[(2,2,6,6-tetramethyl-4-piperidyl)imino]] and subjected to the corrosion test of Example 1, with the result that a corrosion number of 1.0 was obtained.

Example 16

The composition of the polymethylpentene, as described in Example 4, improved the melt flow of the resulting treated polymer. Repelletizing polymer from the first melt flow test and subjecting it to a second melt flow test increased the melt flow. Polymethylpentene treated with the stabilizers of Example 4 showed a reduced secondary melt flow relative to unstabilized polymethylpentene. Polymethylpentene from the second melt flow test was repelletized and subjected to a third melt flow test. Again the tertiary melt flow values are lower for stabilized compositions relative to unstabilized compositions. The melt flow test is a variation of ASTM D 3835-79, run at 260° C. with a 5 kg weight. These values may be more easily understood by reference to the following table:

TABLE I

Initial and Sequential Melt Flows of Stabilized and Unstabilized Polymethylpentene Polymer

| Composition | Melt flows | | | Corrosion |
|---|---|---|---|---|
| | Initial | Secondary | Tertiary | |
| Polymethylpentene (PMP) | 28 | 36 | 58 | 3.0 |
| PMP + 0.2 php A[(1)] + 0.3 php B[(2)] | 10 | 14 | 18 | 1.5 |
| PMP + 0.2 php A + 0.3 php B + 0.05 php C[(3)] | 8 | 12 | 16 | 1.5 |
| PMP + 0.2 php A + 0.3 php B + 0.1 php C | 8 | 11 | 14 | 1.0 |
| PMP + 0.2 php A + 0.3 php B + 0.1 php D[(4)] | 7 | 11 | 14 | 1.5 |
| PMP + 0.2 php A + 0.3 php B + 0.1 php E[(5)] | 7 | 11 | 13 | 2.5 |

Notes to Table 1
1)A is tris-(3,5-ditert-butyl-4-hydroxybenzyl)isocyanurate
2)B is bis(2,4-ditert-butyl)pentaerythritol diphosphite
3)C is zinc stearate
4)D is calcium stearate
5)E is 2,6-ditert-butyl-paracresol (sold as BHT, available from Uniroyal Chemical Co.)
Melt flows were determined using ASTM procedure D 3835-79, at 260° C. with a 5 kg weight Examples 2 and 3 show how an isocyanurate anti-oxidant for polymers or a diphosphite anti-oxidant for polymers act to impart corrosion stability to polymethylpentene by reference to Example 1. Examples 10 and 11 demonstrate that these same polymer anti-oxidant compounds, used in Examples 2 and 3 to impart a corrosion resistance to polymethylpentene, do not impart a corrosion resistance to polypropylene by reference to Example 9. Example 4 shows that the combination of an isocyanurate anti-oxidant compound and a diphosphite anti-oxidant compound imparts in improved corrosion resistance to polymethylpentene relative to their use singly, as in Examples 2 and 3. Example 5 shows that adding metal stearate lubricant compounds to the combination of Example 4 further improves the corrosion resistance of the polymethylpentene. Example 6 shows that adding a hindered amine light stabilizer compound to the combination of Example 4 improves the corrosion resistance of polymethylpentene to the point that no corrosion is observed in the corrosion test used in Example 1. Examples 7 and 8 demonstrate that various other anti-oxidant compounds do not necessarily impart corrosion resistance to polymethylpentene as shown in Examples 2 through 5. Example 12 shows that the combination of Example 4, effective for imparting corrosion resistance to polymethylpentene are ineffective in imparting corrosion resistance to polypropylene. Example 13 shows that the addition of a metal stearate lubricant compound to the combination of Example 12 produces a slight improvement in the corrosion resistance of polypropylene. Comparison of Examples 14 and 15 with Examples 1 and 6 show that the additives used in examples 6 and 15 are effective with polymethylpentene and ineffective with polypropylene. Example 16 shows that the combination of Example 4 produces additional benefits to the polymethylpentene by reducing the initial and sequential melt flows of the polymer.

While this invention has been described in detail for the purpose of illustration, it is not to be construed as limited thereby but is intended to cover all changes and modifications within the spirit and scope thereof.

That which is claimed is:

1. A method comprising encapsulating a metal object whereby corrosion is reduced by using a polymer composition comprising;
    (a) a polymer selected from homopolymers and copolymers of 4-methyl-1-pentene;
    (b) tris-(3,5-ditert-butyl-4-hydroxybenzel)isocyanurate; and
    (c) bis(2,4-ditert-butyl)pentaerythritol diphosphite.

2. A method according to claim 1 wherein said polymer composition comprises tris-(3,5-ditert-butyl-4-hydroxybenzyl)isocyanurate within the range of about 0.1 to about 1 parts by weight per 100 parts by weight homopolymer or copolymer and bis-(2,4-ditert-butyl)-pentaerythritol diphosphite within the range of about 0.1 to about 1 parts by weight per 100 parts by weight homopolymer or copolymer.

3. A method according to claim 1 wherein said polymer composition comprises tris-(3,5-ditert-butyl-4-hydroxybenzyl)isocyanurate within the range of about 0.1 to about 0.3 parts by weight per 100 parts by weight homopolymer or copolymer and bis-(2,4-ditert-butyl)-pentaerythritol diphosphite within the range of about 0.2 to about 0.4 parts by weight per 100 parts by weight homopolymer or copolymer.

4. A method according to claim 1 wherein said polymer composition comprises tris-(3,5-ditert-butyl-4-hydroxybenzyl)isocyanurate within the range of about 0.15 to about 0.25 parts by weight per 100 parts by weight homopolymer or copolymer and bis-(2,4-ditert-butyl)pentaerythritol diphosphite within the range of about 0.25 to about 0.35 parts by weight per 100 parts by weight homopolymer or copolymer.

5. A method according to claim 1 wherein said polymer composition further comprises compounds selected from the group consisting of poly[[6-[(1,1,3,3-tetramethylbutyl)amino]-5-triazine-2,4-diyl][(2,2,6,6-tetramethyl-4-piperidyl)imino]hexamethylene-[(2,2,6,6-tetramethyl-4-piperidyl)imino]], metal stearates, and mixtures thereof.

6. A method according to claim 5 wherein said poly[[6-[(1,1,3,3-tetramethylbutyl)amino]-5-triazine-2,4-diyl][(2,2,6,6-tetramethyl-4-piperidyl)imino]hexamethylene-[(2,2,6,6-tetramethyl-4-piperidyl)imino]] is present in the range of about 0.1 to about 1 part by weight per 100 parts by weight homopolymer or copolymer.

7. A method according to claim 5 wherein said metal stearates are present in the range of about 0.05 to about 1 part by weight per 100 parts by weight homopolymer or copolymer.

8. A method according to claim 5 wherein said metal stearates are selected from the group consisting of zinc stearate, calcium stearate, and mixtures thereof.

9. A method comprising coating a metal object whereby corrosion is reduced by using a polymer composition comprising;
    (a) a polymer selected from homopolymers and copolymers of 4-methyl-1-pentene;
    (b) tris-(3,5-ditert-butyl-4-hydroxybenzyl)isocyanurate; and
    (c) bis-(2,4-ditert-butyl)pentaerythritol diphosphite.

10. A method according to claim 9 wherein said polymer composition comprises tris-(3,5-ditert-butyl-4-hydroxybenzyl)isocyanurate within the range of about 0.1 to about 1 parts by weight per 100 parts by weight homopolymer or copolymer and bis-(2,4-ditert-butyl)-pentaerythritol diphosphite within the range of about 0.1 to about 1 parts by weight per 100 parts by weight homopolymer or copolymer.

11. A method according to claim 9 wherein said polymer composition comprises tris-(3,5-ditert-butyl-4-hydroxybenzyl)isocyanurate within the range of about 0.1 to about 0.3 parts by weight per 100 parts by weight homopolymer or copolymer and said bis-(2,4-ditert-butyl)pentaerythritol diphosphite within the range of about 0.2 to about 0.4 parts by weight per 100 parts by weight homopolymer or copolymer.

12. A method according to claim 9 wherein said polymer composition comprises tris(3,5-ditert-butyl-4-hydroxybenzyl)isocyanurate within the range of about 0.15 to about 0.25 parts by weight per 100 parts by weight homopolymer or copolymer and bis-(2,4-ditert-butyl)pentaerythritol diphosphite within the range of about 0.25 to about 0.35 parts by weight per 100 parts by weight homopolymer or copolymer.

13. A method according to claim 9 wherein said polymer composition further comprises compounds selected from the group consisting of poly[[6-[(1,1,3,3-tetramethylbutyl)amino]-5-triazine-2,4-diyl][(2,2,6,6-tetramethyl-4-piperidyl)imino]hexamethylene-[2,2,6,6-tetramethyl-4-piperidyl)imino]], metal stearates, and mixtures thereof.

14. A method according to claim 13 wherein said poly[[6-[(1,1,3,3-tetramethylbutyl)amino]-5-triazine-2,4-diyl][(2,2,6,6-tetramethyl-4-piperidyl)imino]hexamethylene-[(2,2,6,6-tetramethyl-4-piperidyl)imino]] is present in the range of about 0.1 to about 1 part by weight per 100 parts by weight homopolymer or copolymer.

15. A method according to claim 13 wherein said metal stearates are present in the range of about 0.05 to about 1 part by weight per 100 parts by weight homopolymer or copolymer.

16. A method according to claim 13 wherein said metal stearates are selected from the group consisting of zinc stearate, calcium stearate, and mixtures thereof.

17. A method comprising encapsulating a metal object whereby corrosion of the metal object is reduced by using a polymer composition comprising:
    (a) a polymer selected from homopolymers and copolymers of 4-methyl-1-pentene;
    (b) from about 0.1 to about 0.3 parts by weight per 100 parts by weight homopolymer or copolymer of tris-(3,5-ditert-butyl-4-hydroxybenzel)isocyanurate; and
    (c) from about 0.2 to about 0.4 parts by weight per 100 parts by weight copolymer or homopolymer of bis-(2,4-ditert-butyl)pentaerythritol diphosphite.

18. A method according to claim 17 wherein said polymer composition further comprises compounds selected from the group consisting of poly[[6-[(1,1,3,3-tetramethylbutyl)amino]-5-triazine-2,4-diyl][(2,2,6,6-tetramethyl-4-piperidyl)imino]hexamethylene-[(2,2,6,6-tetramethyl-4-piperidyl)imino]], metal stearates, and mixtures thereof.

19. A method comprising coating a metal object whereby corrosion of the metal object is reduced by using a polymer composition comprising:
   (a) a polymer selected from homopolymers and copolymers of 4-methyl-1-pentene;
   (b) from about 0.1 to about 0.3 parts by weight per 100 parts by weight homopolymer or copolymer of tris-(3,5-ditert-butyl-4-hydroxybenzyl)isocyanurate; and
   (c) from about 0.2 to about 0.4 parts by weight per 100 parts by weight copolymer or homopolymer of bis-(2,4-ditert-butyl)pentaerythritol diphosphite.

20. A method according to claim 19 wherein said polymer composition further comprises compounds selected from the group consisting of poly[[6-[(1,1,3,3-tetramethylbutyl)amino]-5-triazine-2,4-diyl][(2,2,6,6-tetramethyl-4-piperidyl)imino]hexamethylene-[(2,2,6,6-tetramethyl-4-piperidyl)imino]], metal stearates, and mixtures thereof.

* * * * *

UNITED STATES PATENT AND TRADEMARK OFFICE
CERTIFICATE OF CORRECTION

PATENT NO. : 5,000,917

DATED : March 19, 1991

INVENTOR(S) : Kenneth W. Willcox

It is certified that error appears in the above-identified patent and that said Letters Patent is hereby corrected as shown below:

On the title page: Item [54]: delete "POLYMETHYLPHENTHENE" and insert ---POLYMETHYLPENTENE---.

Column 1, line 3, delete "POLYMETHYLPHENTHENE" and insert ---POLYMETHYLPENTENE---.

Signed and Sealed this

Twenty-ninth Day of June, 1993

Attest:

MICHAEL K. KIRK

Attesting Officer

Acting Commissioner of Patents and Trademarks